United States Patent
Wright

[11] 3,980,936
[45] Sept. 14, 1976

[54] D.C. CONTROL CIRCUITS

[75] Inventor: Maurice James Wright, Solihull, England

[73] Assignee: Joseph Lucas Limited, Birmingham, England

[22] Filed: Apr. 15, 1975

[21] Appl. No.: 568,257

[30] Foreign Application Priority Data
Apr. 19, 1974 United Kingdom............... 17186/74

[52] U.S. Cl.................................. 318/246; 318/332
[51] Int. Cl.²........................................... H02P 5/16
[58] Field of Search ............ 318/139, 246, 332, 597

[56] References Cited
UNITED STATES PATENTS

| | | | |
|---|---|---|---|
| 3,566,237 | 2/1971 | Moore et al. ........................ | 318/332 |
| 3,590,352 | 6/1971 | Ries et al. ........................... | 318/246 |
| 3,707,660 | 12/1972 | Nijhof et al. ..................... | 318/332 X |
| 3,855,511 | 12/1974 | Smith.............................. | 318/332 X |

*Primary Examiner*—Robert K. Schaefer
*Assistant Examiner*—W. E. Duncanson, Jr.
*Attorney, Agent, or Firm*—Holman & Stern

[57] ABSTRACT

A d.c. control circuit includes a slew-rate limiting circuit interposed between a current sensing device which detects current in a load and a control circuit, for switching on and off a thyristor controlling current through the load. The circuit limits the slew rate to a level in excess of the maximum normal current slew rate through the load.

5 Claims, 7 Drawing Figures

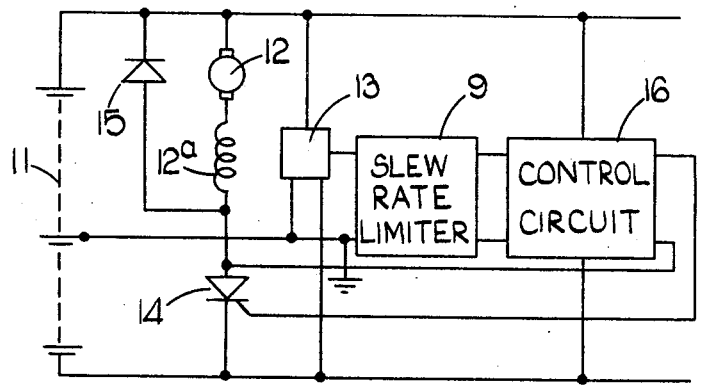
FIG. 1
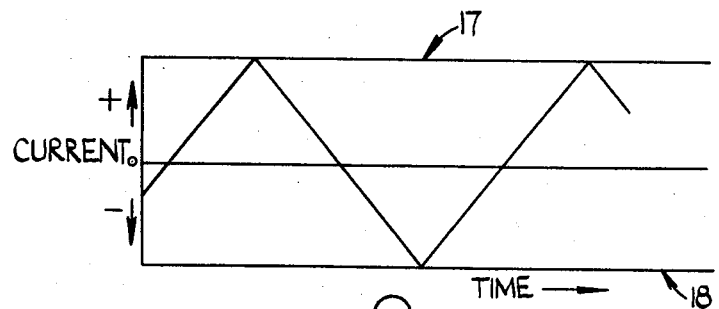
FIG. 2
FIG. 3
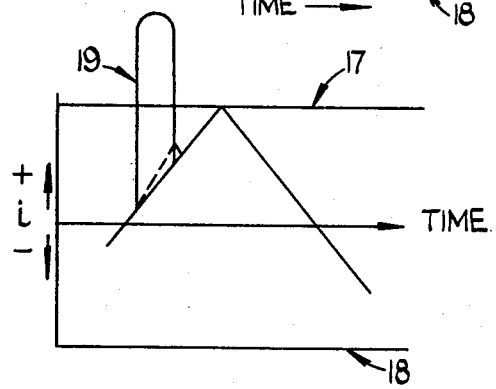
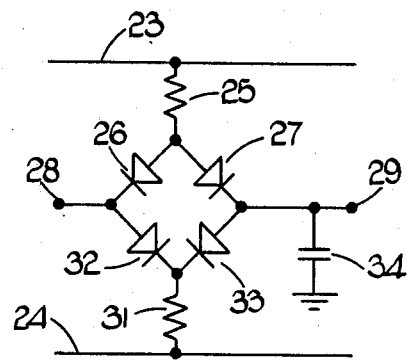
FIG. 4

D.C. CONTROL CIRCUITS

This invention relates to d.c. control circuits of the kind including switch means in series with a load, current sensing means producing a monitoring waveform representing the current flow in the load, and control means for turning the switch means off when the current flow in the load reaches a first level, and turning the switch means on when the current falls to a second and lower level. Either the first or second levels, or both, can be varied to control the mean current flow in the load.

Circuits of this kind suffer from the disadvantage that noise on the monitoring waveform can cause spurious switching. Conventional filters cannot cope adequately with this problem.

The invention resides in a d.c. control circuit of the kind specified, including means limiting the rate of change of the monitoring waveform to a level in excess of the normal maximum rate of change of load current.

Figure 5:
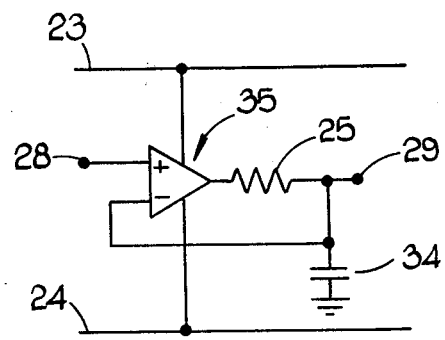
Figure 6:
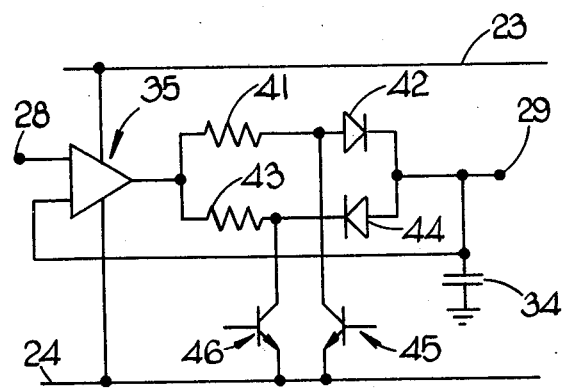
Figure 7:
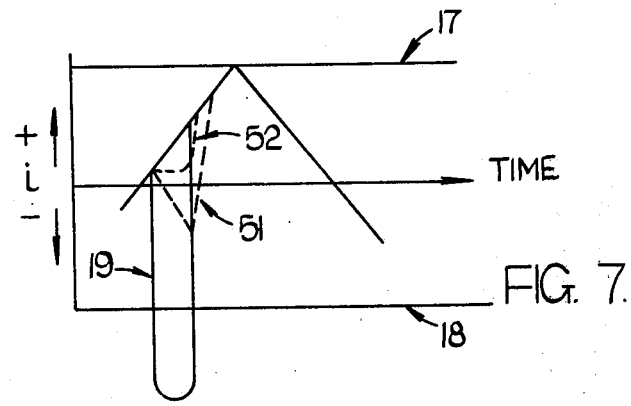

In the accompanying drawings, which illustrate one example of the invention as applied to a control system for a traction motor on a vehicle, FIG. 1 is a block diagram of the system, FIGS. 2 and 3 are graphs illustrating waveforms in the system, FIGS. 4, 5 and 6 are detailed circuit diagrams of parts of the system, and FIG. 7 is a graph showing another waveform.

Referring first to FIG. 1, a vehicle includes a battery 11 across which is connected a series circuit including a drive motor 12 for a vehicle, field winding 12a and a thyristor 14. The motor 12 and field winding 12a are bridged by a freewheel diode 15. The motor current is monitored by a Hall-plate device 13 which receives its supply from the main terminals of the battery 11 and from a centre tapping on the battery which is earthed. The monitored signal is taken from the Hall-plate device 13 with respect to earth to control means 16 connected across the battery 11 and providing outputs to the anode and gate of the thyristor 14.

When the thyristor 14 is on, current rises in the series circuit, and when this current reaches a predetermined value indicated by the level 17 in FIG. 2, the control means 16 provides a signal to the anode of the thyristor 14 to cause the thyristor 14 to cease to conduct. The current then falls as indicated in FIG. 2 until it reaches a second and lower level 18, at which point the control means 16 provides an input to the gate of the thyristor 14 to turn it on, so that the current rises again. This type of control is well known, and typically the levels 17 and 18 are varied in order to vary the mean current flow in the motor 12.

It will be appreciated that electrical noise on the monitored waveform of FIG. 2 can cause spurious switching. A typical pulse caused by noise is indicated at 19 in FIG. 3, and it will be seen that this pulse raises the current level above the line 17, so that the thyristor 14 would be turned to switch off at the wrong time. In order to overcome this problem, there is incorporated in the circuit between the Hall-plate device 13 and the control means 16 a slew rate limiting circuit, that is to say a circuit that limits the maximum rate of change of output voltage to a pre-set value. The effect of such a circuit is shown in dotted lines in FIG. 3. Starting from the point 21 when the interfering pulse 19 commences, the slew rate circuit restricts the way in which its output signal voltage increases until the increasing voltage indicated by the dotted line meets the decreasing current indicated by the downwardly extending vertical line of the transient. At this point, the slew rate circuit again limits the decrease of current as indicated by the dotted line until the point 22 is reached. This arrangement is not of course perfect, because it will still cause early switching if a transient 19 occurs when the current is near the level 17. However, in these circumstances the early switching will not matter so much.

FIG. 4 illustrates one form of slew rate limiting circuit. Supply lines 23, 24 are taken from the main terminals of the battery 11 and typically are at +15 and −15 volts respectively. The line 23 is connected to one end of the resistor 25 the other end of which is connected through the anode-cathode paths of diodes 26, 27 to an input terminal 28 and an output terminal 29 respectively. Another resistor 31 has one end connected to the line 24 and its other end connected to the terminals 28, 29 through the cathode-anode paths of diodes 32, 33 respectively. The terminal 29 is earthed through a capacitor 34.

The terminal 28 is connected to the Hall-plate device 13 while the terminal 29 is connected to the control means 16. For a given mean d.c. input of 3.8 volts varying between 3.6 volts and 4.0 volts all the diodes conduct and the potential at the output terminal is substantially equal to the potential at the input terminal. This of course assumes that the currents change slowly, and the capacitor 34 can charge slowly with changing currents. However, if the input changes rapidly in a positive direction, as a result of the transient, then the diodes 26 and 33 become reversed biased, and the capacitor 34 charges by way of the diode 27 and the resistor 25 at a limited rate. For a one microfarad capacitor 34 and a 15K resistor 25, the maximum rate of change at the terminal 29 is one volt per milli second.

FIG. 5 is basically an operational amplifier equivalent of FIG. 4. Similar components have been indicated by the same reference numeral. The operational amplifier 35 is connected as a voltage follower with a resistor-capacitor "delay network" in its feedback circuit constituted by the resistor 25 and the capacitor 34. For slow input changes the output terminal follows the input terminal accurately, because of the action of the operational amplifier 35. As the rate of change increases, the operational amplifier output increases to supply the necessary charging current to the capacitor 34. When the rate of change exceeds a predetermined value, the entire output from the operational amplifier is needed to charge the capacitor 34 and so rates of change in excess of this are not permitted.

Referring now to FIG. 6, there is shown a modification of FIG. 5 in which the operational amplifier 35 has its output terminal connected to the terminal 29 through parallel paths, one containing a resistor 41 and the anode-cathode path of a diode 42 and the other containing a resistor 43 and the cathode-anode path of a diode 44. The junction of the resistor 41 and diode 42 is connected to the line 24 through the collector-emitter path of an n-p-n transistor 45, and the junction of the resistor 43 and diode 44 is connected to the line 24 through the collector-emitter path of an n-p-n transistor 46. The transistors 45, 46 are coupled to the control means 16 of FIG. 1, and the arrangement is such that when the thyristor 14 is on, the transistor 46 is on and the transistor 45 is off, but when the thyristor 14 is off, the transistor 45 is on and the transistor 46 is off.

It will be seen that in FIG. 6 the feedback path in use at any given moment is determined by whether or not the thyristor 14 is on or off, that is to say by whether or not the current in the motor 12 should be increasing or decreasing. This has an advantage if the current is increasing and a negative-going interference pulse is received, or of course if the current is decreasing and a positive-going interference pulse is received. The effect can be seen in FIG. 7. A negative-going interference pulse 19 occurs when the current should be increasing. The dashed waveform 51 shows what happens with the arrangement of FIG. 4 or FIG. 5. The current is allowed to decrease at a controlled rate, and then is allowed to increase at a controlled rate. Using the arrangement of FIG. 6, advantage is taken of the fact that the current should be increasing, and no decrease of current is permitted whatsoever, so that as shown by the dotted curve 52, the output is held constant until the transient current exceeds the constant current, and is then allowed to increase at the controlled rate. This of course is a result of the fact that the transistor 46 is conducting because the current is increasing when the transient 19 occurs and the capacitor C can, as a result, only be charged in a positive direction by way of the resistor 41 and diode 42, the diode 44 being reversed biased. The circuit therefore ensures a fast return of the monitored waveform to that of the actual load current waveform thereby enabling the control means 16 to operate correctly.

It will be appreciated that where signals from the current monitoring means need to be amplified it is possible to incorporate the slew rate limiting means into the appropriate amplifier.

I claim:

1. A d.c. control circuit including switch means in series with a load, current sensing means producing a monitoring waveform representing the current flow in the load, and control means for turning the switch means off when the current reaches a first level and turning the switch means on when the current falls to a second and lower level, characterised by means limiting the rate of change of the monitoring waveform to a level in excess of the normal maximum rate of change of load current.

2. A d.c. control circuit as claimed in claim 1 in which said rate limiting means includes a resistor and capacitor arangement with the connection of the resistor and capacitor connected to the monitoring input terminal of the control means.

3. A d.c. control circuit as claimed in claim 2 in which the rate limiting means includes a first pair of diodes having their anodes connected together and via a first resistor to a positive supply rail, a second pair of diodes having their anodes connected to the cathodes of the first pair of diodes and the cathodes connected together and via a second resistor to a negative supply rail, the cathode of one of the first diodes being connected to the current sensing means and the cathode of the other of said first diodes being connected to the capacitor of said resistor and capacitor arrangement.

4. A d.c. control circuit as claimed in claim 2 in which said rate limiting means comprises an operational amplifier with its non-invert terminal connected to the current sensing means, its output terminal connected to the resistor and capacitor arrangement, and its invert input terminal connected to the connection of said resistor and capacitor.

5. A d.c. control circuit as claimed in claim 1 in which said rate limiting circuit includes an operational amplifier having its non-invert input terminal connected to the current sensing means, its output terminal connection via a first resistor and a first diode to a capacitor, a second resistor and a reverse connected second diode in series bridging the series combination of said first resistor and first diode, and its invert input terminal connected to the connection of the diodes to the capacitor, and a pair of transistors controlled by the control circuit connecting the connections of the respective resistor/diode combinations to a negative supply rail and arranged so that one transistor conducts only when the switch means is on and the other conducts only when the switch means is off.

* * * * *